United States Patent [19]

Morris

[11] 3,781,794

[45] Dec. 25, 1973

[54] DATA DIVERSITY COMBINING TECHNIQUE

[75] Inventor: Derek S. Morris, Allenhurst, N.J.

[73] Assignee: The United States of America as represented by the Secretary of the Army, Washington, D.C.

[22] Filed: Apr. 18, 1972

[21] Appl. No.: 245,056

[52] U.S. Cl. ............... 340/146.1 R, 325/41, 325/56

[51] Int. Cl. ............................................ G08c 25/00

[58] Field of Search ........... 340/146.1 R, 146.1 BA; 325/38, 41, 42, 56, 323

[56] References Cited

UNITED STATES PATENTS

| | | | |
|---|---|---|---|
| 3,354,433 | 11/1967 | Minc | 325/56 |
| 3,361,970 | 1/1968 | Magnuski | 325/56 |
| 3,372,234 | 3/1968 | Bowsher et al. | 325/323 |
| 3,386,078 | 5/1968 | Varsos | 340/146.1 R |
| 3,391,344 | 7/1968 | Goldberg | 325/323 |
| 3,396,369 | 8/1968 | Brothman et al. | 340/146.1 R |
| 3,422,357 | 1/1969 | Browne | 325/56 |
| 3,633,107 | 1/1972 | Brady | 325/56 |

*Primary Examiner*—Charles E. Atkinson
*Attorney*—Harry M. Saragovitz et al.

[57] ABSTRACT

A data diversity combining technique for a system for data transmission of blocks of data each made up of a combination of M distinct and mutually exclusive types of signal elements occurring at a fixed rate, characterized in that an error indication signal is produced during any data signaling element interval during which the detection circuitry is incapable owing to noise, fading or other signal perturbation, to determine which of the M types of signal elements is present during the signaling element interval. The same data block is transmitted two or more times with each transmitted data block being stored separately, and the signaling elements and accompanying error signals from the various data blocks is combined in a logic circuit to form a new data block consisting of selected signaling elements. Each element is selected from those received during each transmission as the ones with no indicated error; if all have indicated errors an arbitrary choice is made so that any one of the M types of signal elements is selected whenever error signals are associated with all blocks of data.

8 Claims, 2 Drawing Figures

DATA DIVERSITY COMBINING TECHNIQUE

BACKGROUND OF THE INVENTION

In practical data transmission systems, such as M-ary frequency shift keying systems, wherein only one of the M possible discrete types of data signal elements or bits can occur at any given data bit interval, fading or other perturbations of some of the transmitted data bits frequently occurs over the signal transmission path between transmitter and receiver. Moreover, noise is ever present during the data transmission process, sometimes in the form of large amplitude bursts. Consequently, some of the data signal elements or bits may either be accompanied by sufficient noise, or may be perturbed sufficiently, or both, so that it is impossible for the normal data receiving equipment to determine which of the M types of data signal elements is being transmitted. In many prior data transmission systems, one resorts to generating parity codes which, when used in conjunction with the data actually received, enables one to determine that a given data message contains one or more errors. This involves additional and expensive coding equipment located in the transmitter. Size and weight restrictions on certain classes of transmitter preclude the use of this additional circuitry.

In accordance with the present invention, the received data is analyzed bit by bit and, whenever an ambiguity in a given data signal element occurs, an error signal is generated. The entire block of data (message) composed of M discrete kinds of data signal elements, is transmitted two or more times and the received data block passes simultaneously through M frequency-sensitive detectors each including a filter or correlator matched to one of the M types of data signal elements. The detection process includes a comparison of the detected output level of the bank of filters or correlators. If any of the M types of signal elements is perturbed during transmission or is overriden with noise during transmission so that the detector at the receiver cannot determine which type of a data signal element is arriving at any given signal element interval a first logic circuit associated with said detector produces an error signal which accompanies the signaling element. The inability to distinguish between the M data signal elements arises when the outputs from said filters appear to be equal, or as equal as the comparison circuits are capable of detecting. When two or more of these M outputs appear equal, an error signal is produced by a first logic circuit operating on these outputs. The signaling elements and associated error signals, if any, then are stored pending reception of one or more subsequently transmitted blocks of data signal elements which are identical to the first data block. If the same block of data is transmitted over a radio transmission path during two or more different time frames, the probability of identical signal elements of all blocks being faded or perturbed is relatively small. The signal elements and associated error signals for the subsequently transmitted data blocks can be stored in separate memories, or in separate portions of the same memory, so that all such processed data can be "dumped" simultaneously into a second logic circuit, which, in effect, selects the signal element which is unaccompanied by an error signal or selects any one of the M types of signal elements when detection ambiguity occurs, that is, when the corresponding signal elements from all of the stored data blocks are accompanied by an error signal. All of the stored data and error signals are combined in the second logic circuit which provides an output of the same type as the incoming data to the transmitter at the system data output terminal.

The diversity combining system of the invention is highly advantageous in situations wherein size and weight restrictions on the transmitter dictate that the transmitter generate low effective radiated power and use a relatively simple data coding scheme.

DETAILED DESCRIPTION OF THE PREFERRED EMBODIMENT

Figure 1:
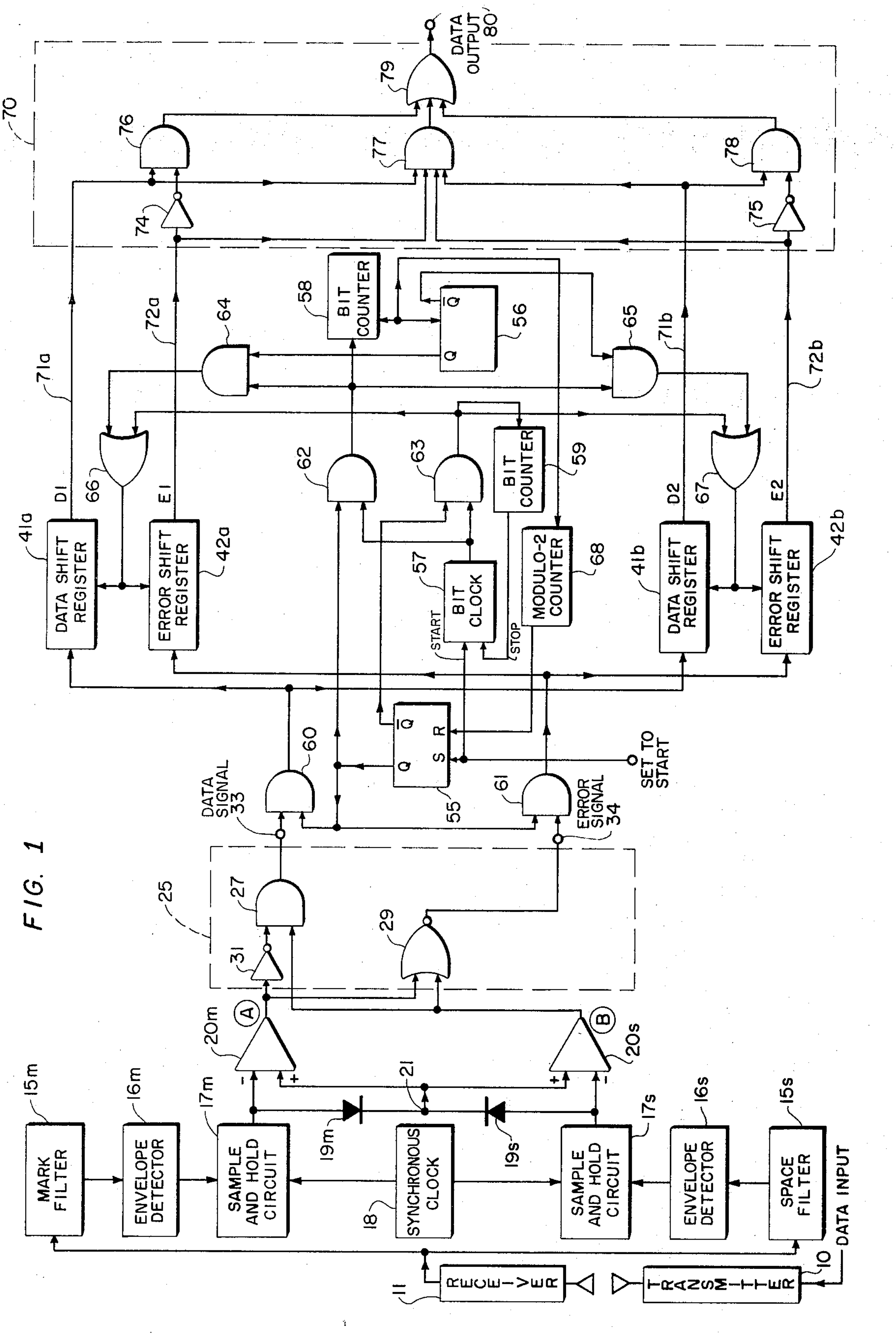
FIG. 1 is a diagram describing an embodiment according to the invention.

Referring to FIG. 1, M-ary data is transmitted by means of transmitter 10 over any radio transmission link to a receiver 11. Although the invention may be applicable to M-aray data systems using, for example, frequency shift keying, phase shift keying, and differential phase shift keying, the system described in FIG. 1 will be assumed to be a binary (M=2) frequency shift keying system which is used to provide a block of binary signal elements, often referred to as mark and space channel elements (or bits) and produced by modulating the carrier frequency between two predetermined values, known as mark and space frequencies. One characteristic of such a system, which is made use of in this invention, is that only one of such mark and space bits can occur during any given bit interval. The frequency shift keying signal from the intermediate frequency stage of receiver 11 is applied to both a mark channel and space channel; the mark channel includes a matched filter 15*m* tuned to the mark frequency, an envelope detector 16*m*, a sample and hold circuit 17*m* responding to clock pulses from synchronous clock 18, rectifier 19*m* and differential amplifier 20*m*. Similarly, the space channel includes a matched filter 15*s*, an envelope detector 16*s*, a sample and hold circuit 17*s* responding to clock pulses fron synchronous clock 18, rectifier 19*s* and differential amplifier 20*s*. The output from the mark and space matched filters 15*m* and 15*s* are applied to the respective envelope detectors 16*m* and 16*s* which serve to reproduce only the modulation envelope and to preserve only the more positive half cycles of the incoming information. If phase shift keying is desired, rather than frequency shift keying, the envelope detectors 16*m* and 16*s* would be eliminated and the sampling would occur directly at the output of the filters 15*m* and 15*s*. Although each matched filter and envelope detector in itself constitutes a frequency sensitive detector, the sample and hold circuits, rectifiers and differential amplifiers will be considered as combining with the matched filter and envelope detector to constitute an error detector. The output of envelope detectors 16*m* and 16*s* is sampled by the respective sample and hold circuits 17*m* and 17*s* at intervals equal to the data bit rate in response to each clock pulse from clock 18. The latter is synchronized with the transmission of frequency shift keying signals from the transmitter and has a frequency equal to the data bit rate. The operation of each matched filter is such that its output at the termination of a given bit interval depends upon the noise and signal content during that entire bit interval. The bandwidth of the matched filters 15*m* and 15*s* is designed so that the maximum output is reached at the end of each bit period; this maximum output will be greater as the strength of the signal element increases, since the matched filter provides an integration of the incoming energy. The maximum output from the filter will also be affected by noise and will depend upon the noise level occurring at any time during the data element interval. Consequently, the sampling for a given mark or space bit is made to occur at the end of that bit interval and the sampling of a given data bit, therefore, is delayed by a one bit interval. In other words, the detected output of each matched filter for the first bit of the message is not sampled until time $t_1$, that is, the end of the first bit interval $t_0$ to $t_1$. During the bit interval $t_1$ to $t_2$ occupied by the second bit of the message, an output builds up in at least one of the matched filters and at the end of this second bit interval, that is, at time $t_2$, the detected output of the matched filters again is sampled, and so forth. This sampling is accomplished by means of clock pulse from the clock 18 which is synchronized with the transmission of data. The sample and hold circuits also serve, in the usual manner, to maintain the sampled output constant over the sampling period, that is, until the occurrence of the next sampling pulse from synchronous clock 18. The output from each of the sample and hold circuits 17*m* and 17 is coupled directly to one of the input terminals of a corresponding one of the differential amplifiers 20*m* and 20*s*. The outputs of the sample and hold circuits 17*m* and 17*s* also are supplied to respective diode rectifiers 19*m* and 19*s* connected back-to-back. The junction point 21 of these rectifiers 19*m* and 19*s* is connected to the other terminal of the corresponding differential amplifiers 20*m* and 20 *s*.

If the amplitude level at the outputs from sample and hold circuits 17*m* and 17*s* are substantially equal, there will be equal and opposite current flow in diodes 19*m* and 19*s* and the voltage level at junction point 21 and, therefore, the voltage level at the differential amplifier terminals designated "+" in FIG. 1, will be substantially equal to the voltage at the outputs of the respective sample and hold circuits less the relatively small voltage drop in the diodes. The diodes 19*m* and 19*s* may be conventional germanium diodes having a voltage drop of approximately 0.3 volt during conduction. Since the input to each of the differential amplifiers 20*m* and 20*s* designated "−" is derived directly from the respective sample and hold circuits 17*m* and 17*s*, it is obvious that, for the condition assumed, the two inputs for each of the differential amplifiers would be substantially equal; therefore, the output levels of the two differential amplifiers must be substantially zero. The gain of the differential amplifiers can be set, for example, so that saturation occurs so long as the outputs from the corresponding sample and hold circuit differs from the forward biasing drop of one of the diodes by about 1 millivolt. In other words, the level of the differential amplifier can be adjusted so that the output therefrom is zero for the condition of equal sample and hold amplitude levels.

If on the other hand, the outputs of the sample and hold circuits 17*m* and 17*s* are unequal, the diode 19 connected directly to the sample and hold circuit 17 whose output has the greater magnitude will, upon attainment of steady state condition, conduct to the exclusion of the other diode 19. For example, if the output of the mark channel sample and hold circuit 17*m* is larger than that of the space channel sample and hold circuit 17*s*, diode 19*m* will conduct and the voltage at junction point 21 will reach substantially the voltage level from the sample and hold circuit 17*m*. Obviously, then, the two inputs to the differential amplifier 20*m* will be substantially equal and the output therefrom will be zero; in other words, a binary ZERO will appear at the output of differential amplifier 20*m*. Concurrently, diode 19*s* will be cutoff by the positive voltage of junction point 21 and the latter voltage will be applied to the "+" input of differential amplifier 20*s*, together with the voltage output from sample and hold circuit 17*s*. Since the output from the sample and hold circuit 17*s* which appears at the "+" input terminal of differential amplifier 20*s* is postulated as larger than the output from the sample and hold circuit 17*s* appearing at the "−" input terminal of differential amplifier 20*s*, the output of the latter will be substantial and will represent a ONE condition. The exact level of ONES and ZEROS can be set as a function of the gain of the differential amplifiers and the threshold of the inverter and the various AND and NOR gates in logic circuit 25.

Finally, if the output of sample and hold circuit 17*s* is greater than that from sample and hold circuit 17*m*, diode 19*s* only will be conductive and the voltage at junction point 21 appearing at the "+" input of both differential amplifier circuits 20*m* and 20*s* will be the larger of the two voltages, that is, the voltage output from the sample and hold circuit 17*s*. The differential amplifier 20*m* now will provide an output which can be interpreted as a binary ONE, while the output of the differential amplifier 20*s* will respond to the two substantially equal inputs thereto to provide a binary ZERO.

Figure 2:
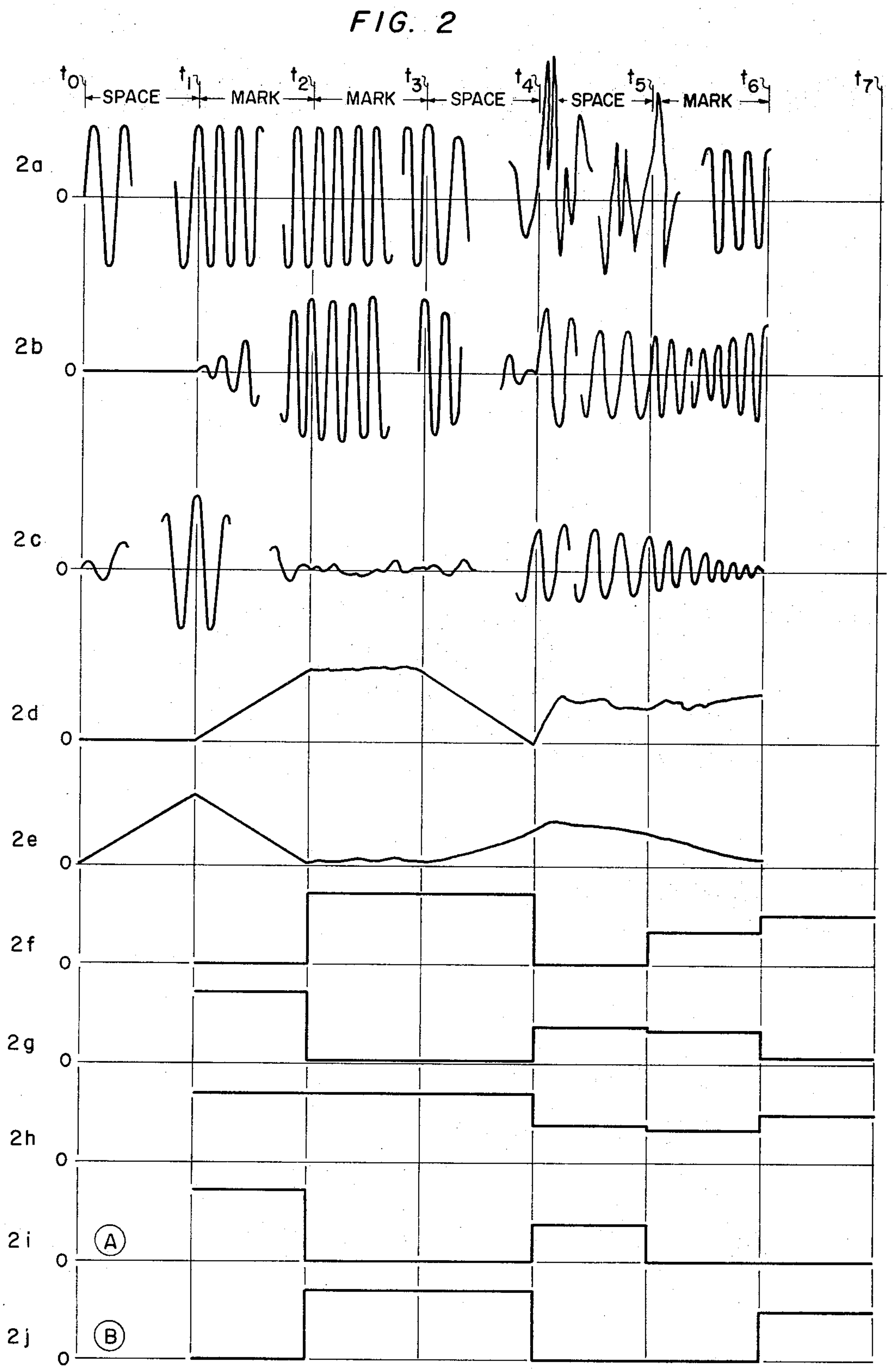
FIG. 2 are waveforms illustrating the operation of the embodiment of FIG. 1.

A more complete description of operation of the system of FIG. 1 will be explained with the aid of the waveforms shown in FIG. 2. A typical FSK data block, as originally transmitted, is shown in FIG. 2*a*, assuming, for the sake of explanation only, that the original data block contains six bits and, further, that, the data block is 011001 (where a "1" represents a space). The data block may have any total number data elements and may be subdivided into any number of groups and also may include one or more auxiliary bits, such as synchronizing bits, in addition to the data bits. It will be noted that the bits in the data block assumed would be generated and transmitted in the order printed above, that is, the first data bit "0" would occur during the interval $t_0$ to $t_1$ and the sixth (last) data bit "1" would arrive at the time interval $t_5$ to $t_6$. It will be assumed further that the FSK data block applied to the mark and space matched filters 15*m* and 15*s* of FIG. 1 actually is as shown in FIG. 2*a*, with variations from normal being the result of noise and atmospheric fading. As illustrated in FIG. 2*a*, the mark frequency is the higher of the two FSK frequencies. The received FSK data input signal passes through the matched filters 15*m* and 15*s* and the outputs therefrom are shown in respective FIGS. 2*b* and 2*c*. The filtered data block signals are detected by corresponding envelope detectors 16*m* and 16*s* to provide the signals shown in respective FIGS. 2*d* and 2*e*. Assuming that there is no noise or fading of the signal during the first assumed bit interval $t_0$ to $t_1$, which is a space or ZERO interval, there will be no output from the matched mark filter 15$m$ during this interval, as indicated in FIG. 2$b$. During the same interval $t_0$ to $t_1$, a signal of increasing amplitude appears at the output of matched space filter 15 $s$ as shown in FIG. 2$c$. Since the matched space filter 15$s$ integrates the space signal, which is assumed here to be of constant amplitude, the filtered signal level builds up more or less linearly in space filter 15$s$ during the interval $t_0$ to $t_1$, as shown in FIG. 2$c$.

During the next interval $t_1$ to $t_2$, during which a mark or ONE is assumed to arrive, the mark filter level gradually rises until it attains a maximum level representative of the mark signal level of FIG. 2$a$ during interval $t_1$ to $t_2$. The output from space filter 15$s$, as shown in FIG. 2$c$, gradually drops to zero during the time interval $t_1$ to $t_2$ from the original peak value of output attained during the previous space bit interval $t_0$ to $t_1$. The mark filter signal level does not increase instantaneously from zero to a maximum, nor does the output of the space filter 15$s$ drop suddenly to zero, because of the integrating action of the matched filters. The matched filters are designed with a bandwidth such that the output level therefrom at the end of a given bit interval, that is, at times $t_1$, $t_2$, etc., reaches its maximum amplitude, or, in the case of cessation of a given type signal element, its minimum amplitude, in the absence of any noise. Thus, the level from the matched space filter 15$s$ at time $t_1$ has just reached its minimum value which is a function of the amplitude of the space signal during time $t_0$ to $t_1$. During the presence of the mark data bit at time interval $t_1$ to $t_2$, the output from mark filter 15$m$ builds up linearly, assuming no noise or any non-linear perturbation of the signal during this mark interval, until it reaches a maximum value at the end $t_2$ of the mark bit interval. The output of the space filter 15$s$, in the meantime, gradually falls to substantially zero at the end $t_2$ of the mark bit interval - which it should do, since there is no longer any space bit and a condition of no noise has been assumed.

During the next time interval $t_2$ to $t_3$, another mark bit is present. In the absence of noise, the output of mark filter 15$m$ will remain at the same level throughout the time interval $t_2$ to $t_3$ as that achieved at time $t_2$. During this interval, however, small amplitude noise is postulated, as evident in FIG. 2$c$; so that noise fluctuations occur in the mark filter output during the interval $t_2$ to $t_3$. These fluctuations are smoothed out somewhat by the envelope detectors, as indicated by the waveforms of FIG. 2$d$ and 2$e$. During the time interval $t_3$ to $t_4$, a space bit occurs and the output of mark filter 15$m$ thus decreases gradually to zero, since no noise is assumed for this time interval. Some fading of the space signal, with no accompanying noise, is assumed, so that the output from space filter 15$s$ increases to a final value at time $t_4$ less than that achieved at time $t_1$. The output of envelope detector 16$s$ for this time interval is substantially linear, as shown in FIGS. 2$d$ and 2$e$. During the time interval $t_4$ to $t_5$, another space bit appears, this time accompanied by a substantial amount of noise, and the mark filter output is as indicated in FIG. 2$b$. The resulting space filter output appears in FIG. 2$c$ and the effect of noise on the signal in the case illustrated so pronounced that the output levels attained at the end $t_5$ of this bit period are approximately the same for both mark and space channels, as shown in FIGS. 2$b$ and 2$c$. It is possible, of course, for the noise to predominate over the signal to such an extent that the output at time $t_5$ would be greater from the mark filter 15$m$ than from the space filter 15$s$. A mark bit occurs during the time interval $t_5$ to $t_6$ which is assumed to occur in the presence of some noise near the beginning of the bit interval and to undergo some fading. As shown in FIGS. 2$b$ and 2$c$, the output of mark filter 15$m$ attains a first level at time $t_6$ which is somewhat less than that shown for the first mark bit; at the same time, the output from space filter 15$s$ falls to nearly zero at time $t_6$. At the end of each bit interval, that is, at time $t_1$ for the first bit, at time $t_2$ for the second bit, etc., the detected output level of the mark and space filters attained at these instants is sampled by the respective sample and hold circuits 17$m$ and 17$s$ and maintained by the latter at that level until arrival of the next sample and hold pulse. The outputs of the sample and hold circuits 17$s$ and 17$m$ of the mark and space channels is shown in respective FIGS. 2$f$ and 2$g$.

As already explained, the sample and hold output which is of the greater magnitude will prevail at junction point 21 of the circuit of FIG. 1, so that the "+" inputs to both differential amplifiers 20$m$ and 20$s$ will be as shown in FIG. 2$h$. A comparison of the "−" input to differential amplifier 20$m$ will result in an output from differential amplifier 20$m$ in the mark channel as shown in FIG. 2$i$. Similarly, a comparison of the "−" input (FIG. 2$g$) to differential amplifier 20$s$ in the space channel with the common input (FIG. 2$h$) provides an output from differential amplifier 20$s$ as shown in FIG. 2$j$.

The binary outputs shown in FIG. 2$i$ and 2$j$ derived at the output of respective differential amplifiers 20$m$ and 20$s$, and represented by the corresponding letters A and B (See FIG. 1) are applied to the logic circuit which includes AND gate 27, NOR gate 29, and inverter 31. The output A is applied directly to NOR gate 29. After inversion by inverter 31, the output A also is applied to AND gate 27. The output B is applied directly to AND gate 27 and also to NOR gate 29. The output of AND gate 27 serves as the data signal at terminal 33.

The operation of the logic circuit 25 is best explained by reference to the logic truth Table I. A fourth combination of inputs A and B namely, A=1, B=1, is not considered as it cannot be generated by the previous circuit; the receipt of equal energy of mark and space signal at any level results in A=0, B=0.

TABLE I

| Inputs | DATA output from AND Gate 27 | ERROR output from NOR Gate 29 |
|---|---|---|
| A B | $\bar{A}\cdot B$ | $\overline{A+B}$ |
| 0 0 | $1\cdot 0=0$ | $\overline{0+0}=\bar{0}=1$ |
| 0 1 | $1\cdot 1=1$ | $\overline{0+1}=\bar{1}=0$ |
| 1 0 | $0\cdot 0=0$ | $\overline{1+0}=\bar{1}=0$ |

Referring back to FIG. 2, it will be evident, for example, that for the first space bit interval, i.e., at time $t_1$, A = 1 and B = 0 (see FIG. 2$i$). For this condition, the output of AND gate 27 appearing at the DATA terminal is a zero and the output of the OR gate 30, appearing at the ERROR terminal, is a ZERO. Similarly, at times $t_2$, $t_3$, $t_4$, $t_5$ and $t_6$, one obtains the combinations (A = 0, B = 1), (A = 0, B = 1), (A = 1, B = 0), (A = 0, B = 0) and (A = 0, B = 1), all respectively.

From the time $t_1$ up to time $t_7$, the binary outputs of the data and error terminals 33 and 34 are applied to the respective data and error shift registers 41$a$ and 42a. In the example given, the information entered into data register 41a would be 0, 1, 1, 0, 0, 1 and the data information entered into error register 42a would be 0, 0, 0, 0, 1, 0. From time $t_7$ up into time $t_{13}$, the binary outputs now appearing at the data and error terminals 33 and 34 are applied to the corresponding data and error shift register 41b and 42b.

These shift registers serve to identify and store separately the data bits and error signals, if any, for each data block until a later time — usually as soon as the last pair of shift registers has been filled — at which time the data bits and any error signals for all data banks can be supplied simultaneously to a second logic circuit 70. Although two separate pairs of storage elements, 41a, 42a and 41b, 42b, are shown in FIG. 1, it should be understood that the data and error information for the individual data banks may be stored in separate portions of a single memory.

The operation of the typical process data mode of FIG. 1 will now be described. The equipment for this processing includes, in addition to the shift registers 41a, 42a, 41b and 42b, a pair of flip-flops 55 and 56, a bit clock 57 which emits clock pulses synchronized with the sample pulses of the sample and hold circuits 17m and 17s (and, thus, occurring at the end of each data bit interval), two k-bit counters 58 and 59, (k being the number of bits in the data block), and a modulo-2 counter 68. In addition, the processing equipment includes AND gates 60 to 65, inclusive, and the OR gates 66 and 67.

A start pulse arriving at time $t_1$, that is after a one-bit delay, serves to start bit clock 57 and set flip-flop 55. As each bit clock pulse appears, it is applied to AND gates 62 and 63. When flip-flop 55 is set by the start pulse at set terminal S, a ONE input is derived from the Q terminal thereof. This output enables AND gate 62 and the bit clock pulses from clock 57 are applied to the k-bit counter 58 (k here is assumed to be 6) and also to AND gates 64 and 65.

The output from terminal Q of flip-flop 56 is supplied to AND gate 64, along with the bit clock output from AND gate 62, and the output from AND gate 64 passes through OR gate 66 to the first data and error shift registers 41a and 42a. As each of the k=6 bit pulses occur, the shift registers 41a and 42a are operated to shift the information contained therein one bit position. After six counts, that is, at time $t_6$, all of the information is loaded in the first pair of shift registers 41 and 42. During this period from time $t_1$ until time $t_6$, the AND gate 65 does not receive any enabling pulses from the terminal $\overline{Q}$ of flip-flop 56 so that the OR gate 67 receives no input therefrom. Furthermore, the other input to OR gate 67 still is inactive, since the $\overline{Q}$ terminal of the first flip-flop 55 is a ZERO and supplies no enabling input to AND gate 63. For this reason, there are no shift pulses applied to the second pair of data and error shift registers 41b and 42b. As soon as k=6 bits have been counted, that is, at time $t_6$, an output is derived from counter 58 which is supplied to the flip-flop 56 and to the modulo-two counter 60. A ONE output now appears at terminal $\overline{Q}$ of flip-flop 56 and this output is applied to AND gate 65, which gate also is supplied with bit clock pulses passing through the AND gate 62. The output of AND gate 62 passing through OR gate 67 effects a shift of the contents of the second pair of shift registers 41b and 42b. The next k information bits are shifted into these registers 41b and 42b.

From time $t_1$ until time $t_{12}$, the data and error information is supplied by AND gate 60 and 61 — which have been enabled by the one pulse from terminal Q of flip-flop 55 — to the shift registers 41a, 41b, 42a and 42b. From the time $t_1$ until the time $t_6$ data and error information is fed into shift registers 41a and 42a only; the data and error information register occurring from time $t_6$ until time $t_{12}$ is fed into shift registers 41b and 42b only.

At time $t_{12}$, the six-bit counter 58 again provides an output to first flip-flop 55, as well as another pulse to modulo-two counter 68. The output now derived from this counter 68 resets flip-flop 55, whereupon the output from terminal Q of flip-flop 55 changes from a ONE to a ZERO and the AND gate 62 is disabled. Furthermore, AND gates 60 and 61 also are disabled, so that no data or error information can be supplied from the DATA and ERROR terminals 33 and 34 of logic circuit 25 to the various shift registers. The Q terminal of flip-flop 56 again becomes a ONE; however, AND gate 64 cannot receive any input from bit clock 57 by way of AND gate 62. The AND gate 65 is disabled by the ZERO appearing at the $\overline{Q}$ terminal of flip-flop 56, as well as by the fact that AND gate 62 is closed. However, the AND gate 63 receives the ONE output from terminal $\overline{Q}$ of flip-flop 55 and the bit clock pulses from clock 57 pass through AND gate 63 to the OR gate 66 and 67. Consequently, from time $t_{12}$ until time $t_{18}$, data and error information written previously into the shift registers 41a, 41b, 42a and 42b can be read out. At time $t_{18}$, that is, after the sixth count from bit counter 59 has passed through AND gate 63 (having been opened initially at time $t_{12}$), the output from counter 68 undergoes a transition from a ZERO to a ONE. This ONE pulse is applied to bit clock 57, and stops it. Henceforth, therefore, both AND gates 62 and 63 are disabled and no longer supply inputs to the OR gate 66 and 67. The other pulse for the OR gate 66 and 67, namely the outputs from AND gate 64 and 65, were previously disabled when AND gate 62 was disabled. It will be noted that the six-bit counter 58 and counter 59 has received no pulses from bit counter 57 after time $t_{12}$. The cycle of operation now is completed and the next cycle can be initiated by again setting the flip-flop 55, either manually or otherwise. Summarizing, up until time $t_6$, the data and error signals are entered into the shift registers 41a and 41b by operation of the shift circuitry energized from OR gate 66. From time $t_6$ until time $t_{12}$, the data and error signals are entered into the shift registers 41b and 42b as a consequence of the operation of the shift counter energized from OR gate 67. From time $t_{12}$ until time $t_{18}$, the information entered into all shift registers is serially shifted out of (read from) the registers during each of the six-bit clock pulses from the bit clock 57. Furthermore, each data and error bit of a word is read out from the shift registers 41a and 42a at the same time as the corresponding bit from the shift registers 41b and 42b.

The shift register outputs on lines 71a, 71b, 72a and 72b are supplied to second logic circuit 70 which includes inverters 74 and 75, and AND gates 76, 77, and 78, and the OR gate 79. The binary outputs from the error shift registers 42a and 42b are inverted by inverters 74 and 75 prior to reaching AND gates 76 and 77, all respectively, while the binary outputs from the data shift registers 41a and 41b are applied directly to the corresponding AND gates 76 and 78. The binary outputs of all four shift registers are applied directly to AND gate 77 and the outputs of AND gates 76, 77 and 78 are supplied to OR gate 79. The output of OR gate 79 appears at the data output terminal 80. The operation of the combining logic circuitry 70 is best described by the truth Table II.

TABLE II

| Condition | | Inputs to Logic Circuit 70 | | | | Output AND Gate 76 | Output AND Gate 78 | Output AND Gate 77 | Output OR Gate 79 Data |
|---|---|---|---|---|---|---|---|---|---|
| Error | Data | D1 | D2 | E1 | E2 | $D1 \cdot \overline{E1}$ | $D2 \cdot \overline{E2}$ | $D1 \cdot E1 \cdot D2 \cdot E2$ | Terminal 80 |
| None | Same | 0 | 0 | 0 | 0 | 0 | 0 | 0 | 0 |
| None | Same | 1 | 1 | 0 | 0 | 1 | 1 | 0 | 1 |
| Block 1 | Same | 0 | 0 | 1 | 0 | 0 | 0 | 0 | 0 |
| Block 1 | Same | 1 | 1 | 1 | 0 | 0 | 1 | 0 | 1 |
| Block 1 | Different | 0 | 1 | 1 | 0 | 0 | 1 | 0 | 1 |
| Block 1 | Different | 1 | 0 | 1 | 0 | 0 | 0 | 0 | 0 |
| Block 2 | Same | 0 | 0 | 0 | 1 | 0 | 0 | 0 | 0 |
| Block 2 | Same | 1 | 1 | 0 | 1 | 1 | 0 | 0 | 1 |
| Block 2 | Different | 0 | 1 | 0 | 1 | 0 | 0 | 0 | 0 |
| Block 2 | Different | 1 | 0 | 0 | 1 | 1 | 0 | 0 | 1 |
| Both | Same | 0 | 0 | 1 | 1 | 0 | 0 | 0 | 0 |
| Both | Same | 1 | 1 | 1 | 1 | 0 | 0 | 1 | 1 |
| Both | Different | 0 | 1 | 1 | 1 | 0 | 0 | 0 | 0 |
| Both | Different | 1 | 0 | 1 | 1 | 0 | 0 | 0 | 0 |

The algorithm represented by the logic truth Table II for a system having M = 2 is as follows. If a given data bit of both of the two blocks of data have no associated error bit and the data bits or both blocks are of the same type, either one is selected. If a given data bit of one only of the two data blocks has an associated error signal, the data bit from the other data block, that is, from the data block having no error signal associated therewith, is selected, and it matters not whether the two data bits from the two data blocks are of the same type or different. If a given data bit from both of the data blocks has an error signal associated therewith, the data bit from either of the two data blocks is selected, regardless of whether the data bits of both data blocks are the same or different. The last two conditions shown in Table II represent a truly ambiguous case wherein a logical don't care decision is made by logic circuit 70.

In each of the conditions assumed, it is more precise to state that the output from the logic circuit 70 available at the output data terminal 80, is a signal which reproduces either one of the actual data bits originally existing at the transmitter 10. For example, if a given data bit were a ONE, then the output from the logic circuit 70 would have characteristics identifying said output as a ONE.

If M in the M-ary system is other than two, viz, some other power of two such as four, there must be a like increase in the number of detector channels, including additional amplitude comparison means 17, 19 and 20. In such cases, if any two or more outputs are alike, an error signal would be provided. An example of such a system is a FSK system with M = 4, where each of the four separate data signal elements or tones represent two bits of data, for example, 00, 01, 10 and 11. Four tone channels then are required, each having its own matched filter, envelope detector, sample and hold circuit 17, and the amplitude comparison diodes 19 and amplifiers 20. Since only one tone is transmitted during any given two-bit interval, only one of the output levels of the four channels will be a maximum value (ONE) and all other outputs will be at a lower level (ZERO). Such a system, of course, would require a more complex logic circuit 25, using additional AND or OR gates. The storage process and the logic circuit 70 would be similar to that already described, except that additional separate storage facilities must be provided.

It should be understood that the invention is not limited to the embodiment described herein. For example, although the data and associated error information is described and illustrated as being supplied to hand-wired logic circuits 25 and 70, this information can be sent to a computer which can perform the combining algorithm in accordance with the respective truth Tables I and II. Furthermore, a significant increase in reduction of error rate can be effected if a data block is transmitted three times instead of twice, as indicated in the example shown and described. In this case, majority decisions would be made in those cases where data bits are not in agreement and where either all or none of the bits of the data blocks have associated error bits. Another possibility is to select the two data blocks with the least number of indicated errors to be forwarded to the combining logic circuit 70 and discard the third block. Furthermore, any amount of delay or storage time may be provided between the retransmission of blocks of data, depending largely upon the particular characteristics of the transmission path at the time the messages are being sent.

Consequently, the invention is to be limited only as set forth in the accompanying claims.

What is claimed is:

1. A data system comprising means for transmitting during *n* separate time frames *n* identical blocks of data consisting of M distinctive types of signal elements only one type of which is present during any given bit interval, means for receiving said *n* data blocks, said receiving means comprising angle modulation sensitive detector means for each of said M types of signal elements, amplitude sampling and comparison means for comparing the amplitude levels of the outputs of said M detector means only at the end of each signal element interval to provide outputs dependent upon the relationship of the output levels from said M detector means, and logic circuit means having data signal and error signal terminals and responsive to said outputs to provide a data indicating signal only which appears at said data signal terminal during each signal element interval wherein said amplitude sampling and comparison means provides a detectable difference in said output levels, and an error indicating signal only which appears at said error signal terminal during each signal element interval wherein the amplitude sampling and comparison means yields no detectable difference in output levels.

2. A data system comprising means for transmitting during $n$ separate time frames $n$ identical blocks of data consisting of M distinctive types of signal elements only one type of which is present during any given bit interval, means for receiving said data blocks, said receiving means comprising angle modulation sensitive detector means for each of said M types of signal elements, amplitude sampling and comparison means for comparing the amplitude levels of the outputs of said M detector means at the end of each signal element interval to provide outputs dependent upon the relationship of the output levels from said M detector means, first logic circuit means responsive to said outputs to provide an error indicating signal for each signal element interval during which the amplitude comparison means yields no detectable difference in output levels and a data indicating signal for each signal element interval during which a detectable difference in output levels is detected, second logic circuit means for storing separately the $n$ groups of data and error indicating signals corresponding to each of said $n$ blocks of data, said second logic circuit means being sequentially responsive to the stored data indicating and error indicating signals of the various stored groups to produce a system data output of any of said M types during each given data signal element interval that concurrent error indicating signals exist for all data groups or a system data output during each signal element interval wherein a data indicating signal occurs which is of the same type as a signal element which exists during the signal element interval wherein a data indicating signal occurs.

3. A system according to claim 2 wherein said detector means is sensitive to frequency.

4. A system according to claim 2 wherein said detector means is sensitive to phase.

5. A system according to claim 3 wherein M=2 and said signal elements represent mark and space frequency shift keying signals.

6. A system according to claim 5 wherein one of said detector means includes a matched filter matched to the mark frequency and the other detector means includes a matched filter matched to the space frequency.

7. A system according to claim 6 wherein each amplitude sampling and comparison means includes a sample and hold circuit for sampling the detected amplitude level from the corresponding matched filter at the end of each signal element interval and retaining said level until the start of the next signal element interval.

8. A system according to claim 7 wherein said amplitude sampling means includes a differential amplifier energized by the output of the corresponding sample and hold circuit and by the larger of the two outputs from both sample and hold circuits.

* * * * *